Patented Feb. 5, 1924.

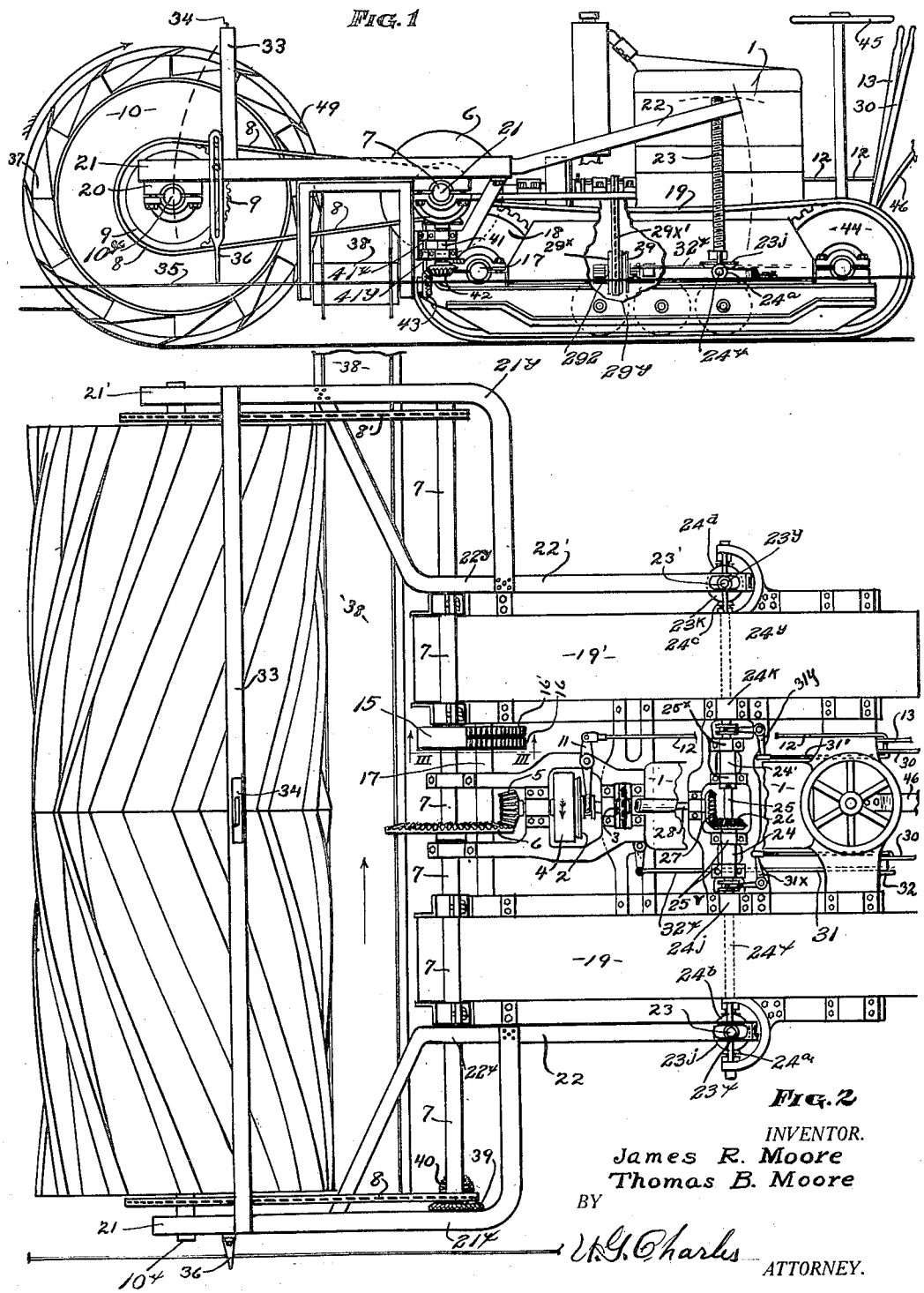

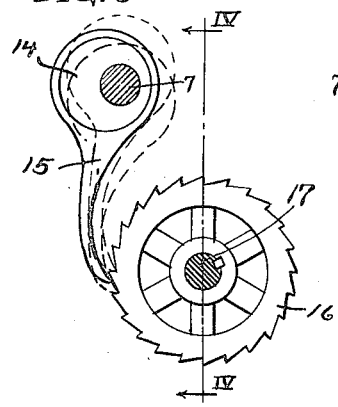
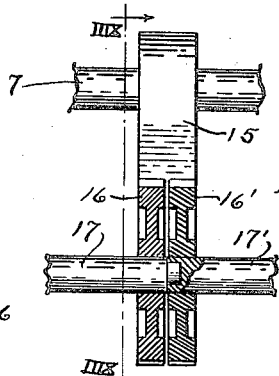
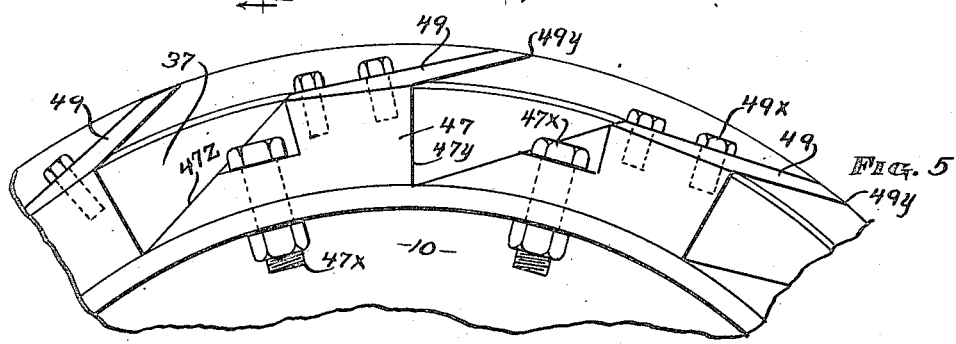
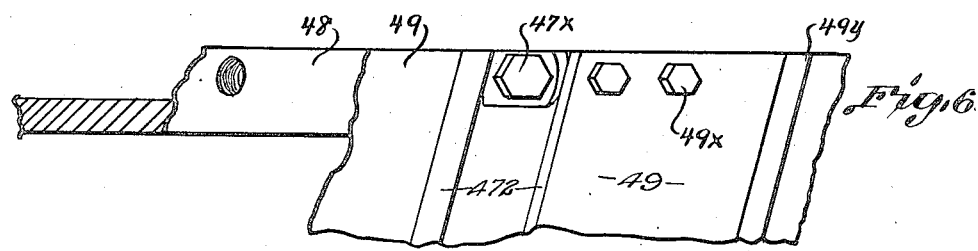
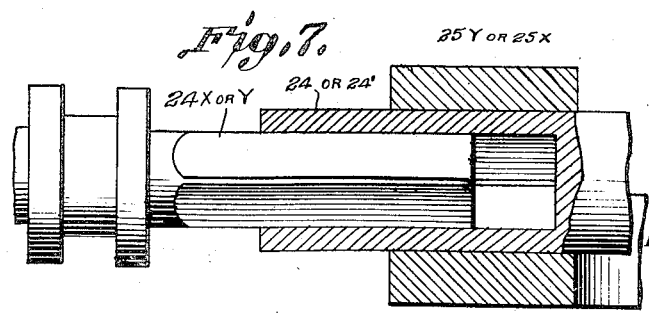
INVENTOR.
James R. Moore
Thomas B. Moore
ATTORNEY.

1,482,904

UNITED STATES PATENT OFFICE.

JAMES R. MOORE AND THOMAS B. MOORE, OF WICHITA, KANSAS.

ROAD-SURFACING MACHINE.

Application filed November 15, 1921. Serial No. 515,237.

*To all whom it may concern:*

Be it known that we, JAMES R. MOORE and THOMAS B. MOORE, citizens of the United States, and residents of Wichita, Kansas, have invented certain new and useful Improvements in Road-Surfacing Machines, of which the following is a description, referring to the drawings which accompany this specification.

The invention relates to a power operating road surfacing machine. By the use of our machine, a roadway may be cut, smoothed and leveled to a desired grade preparatory for paving. Further and specific objects and functions of the invention will be disclosed in the description of the drawings, in which; Fig. 1 is a side view of the machine. Fig 2 is a plan view thereof. Fig. 3 is a view taken along the line III—III in Fig. 2. Fig. 4 is a sectional view taken along the line IV—IV, Fig. 3. Fig. 3 is also a view taken along the line III$^x$—III$^x$ Fig. 4. Fig. 5 is a fragmentary detail side view of the cutter drum. Fig. 6 is a plan view of Fig. 5. Fig. 7 is a detail view of the square ended rods and rod receiving sleeves seen in Fig. 2, with parts in section for clearness of decription. Similar numerals of reference indicate corresponding parts throughout all the figures of the drawings.

Referring to the drawings; centrally located at the rear of the frame of the machine is seen the engine 1 from which power is developed to operate the road surfacing mechanism. The rear part of the machine is a duplicate of the ordinary caterpillar tractor and is provided with the customary clutch, transmission differential and steering mechanism, the engine 1 however also furnishing power for such tractor elements. When the machine operates for road surfacing, the tractor transmission is placed in neutral.

The engine 1 drives a shaft leading to the cone clutch 2 and on this shaft is mounted a small sprocket wheel 3, Fig. 2. The internal part of the clutch 2 when in contact with the external part 4, drives the pinion 5 which drives the ring gear 6 mounted on the transverse shaft 7. At each end of the shaft 7 is rigidly mounted a small sprocket wheel, each of equivalent diameter, and over these sprockets run the chains 8 and 8'. The chain 8 drives the large sprocket 9 rigid on the cutter drum shaft 10$^x$, while a sprocket wheel similar to 9 and arranged at the opposite side of the drum is driven by the chain 8'. The shaft 10$^x$ is rigid with the cutter drum 10.

The clutch 2, Fig. 2 is controlled by a lever arm 11 operated by the shaft 12 leading from the operating lever 13. In Figs. 3 and 4 is shown in detail the ratchet mechanism for transmitting motion to the caterpillar mechanism during road surfacing operations.

On the shaft 7 (see Figs 1, 2, 3 and 4), is mounted an eccentric 14 which revolves in a ratchet member 15 which engages teeth on the wheels 16 and 16'. As seen in Figs. 1 and 2, a short transverse shaft 17 rotates in bearings carried by the frame and carries the wheel 16, while the wheel 16' is rigid on the shaft 17' axially aligned with the shaft 17 as seen in Fig. 4 and rotating in bearings on the frame. Note that the end of the shaft 17 rotates in the recessed end of the shaft 17' as a bearing, thus these shafts may rotate at different speeds when necessary.

On the outer end of the shaft 17 is rigidly mounted a sprocket wheel 18 and it will be understood that the outer end of the shaft 17' likewise carries a sprocket wheel similar to 18. These sprocket wheels 18 drive the caterpillar tracks 19 and 19' during road surfacing operations and serve as sprocket wheels, merely, when the tractor mechanism operates to drive the machine as later mentioned.

When the engine 1 drives the cutter drum 10, the mechanism shown in Figs. 3 and 4 is operated and through the foregoing elements causes the machine to travel slowly forward.

The cutter drum is held level and at the proper height by the following described mechanism. The shaft 10$^x$ of the cutter drum is held in bearings 20 mounted on the bearing arms 21 and 21'; which are pivoted at 21$^x$, 21$^y$ on the ends of the shaft 7. The arms 22 and 22' are riveted to the ends of the arms 21 and 21' and then continue on and out to the arms 21 and 21' where they again connect. The intermediate portion of the arms 22 and 22' pivot likewise at 22$^x$, 22$^y$ on the shaft 7. The inner ends of the arms 22 and 22' each carry a pivoted screw member such as 23$^x$, 23$^y$, Fig. 2, which receives the screw shafts 23 and 23' and on the lower ends of these shafts 23 and 23' are rigidly affixed drivable conical elements 23$^j$, 23$^k$ of a reversible friction drive. The shafts $24^x$, $24^y$, Figs. 1 and 2, of this friction driving mechanism are rotatably and slidably mounted in bearings on the frame as at $24^j$, $24^k$, their inner ends being made square to extend into sleeves 24 and 24′ the receiving portions thereof being fashioned square to receive them as illustrated in Fig. 7, therefore these shafts can slip back and forth in the sleeves. These sleeves are rigid to the shaft 25 rotatably mounted in bearings $25^x$, $25^y$ intermediate the axially aligned shafts $24^x$, $24^y$. On the shaft 25 is mounted a bevel gear wheel 26 which is driven by a bevel gear wheel 27, mounted on the shaft 28. At the opposite end of the shaft 28 is seen a cone 29 of a cone clutch mechanism, Figs. 1 and 2. This cone 29 being slidably mounted on a keyway on the shaft 28. The outer member $29^x$ of the cone clutch mechanism is driven by a chain $29^{x\prime}$ from the sprocket 3. By actuating the levers 30 and 30′ the rods 31, 31′ will operate bell crank $31^x$, $31^y$ the ends of which work in channel grooves on the shafts $24^x$, $24^y$ that deliver the power to the reversible friction drives. The lever 32 operates the same as the lever 13 and through the linking rod $32^x$ operates the lower clutch member 29. Rigid on each shaft $24^x$ and $24^y$ are a pair of friction driving conical elements facing each other as $24^a$, $24^b$ and $24^c$, $24^d$. The members of each set may be alternately shifted to contact the elements $23^j$ or $23^k$ of the proper assembly, or may at will be thrown out of any contract into a neutral position.

It will be noted that when one or either of these reversible clutches are in action, it will operate its screws jack member 23, 23′ and rock the arms 22 and 22′ up or down and thereby adjust the position of the outer drum. Mounted on the outer ends of these arms 22 and 22′ is a U-shaped bar 33 on which is a level 34. By watching the level, the arms of the cutter drum may be adjusted so that the cutter drum stands level. In order to cut to a desired grade, a string 35 is strung upon grade pegs and an adjustable guide 36 is bolted to the arm 21. This guide is made to follow the line 35 and the cutter drum will cut to such grade. The cutter drum revolves in the direction of the arrow, Fig. 1 and as it cuts the earth, the cuttings are collected in the channel shaped sections 37 later described and are carried over the top and dumped on the conveyor 38. This conveyor is transversely arranged immediately in the rear of the drum 10 as seen in Figs. 1 and 2 and is driven in the direction of the arrow by the following mechanism. On the shaft 7 is mounted a bevel gear wheel 39 which drives another bevel gear wheel 40 which is mounted on the shaft 41. On the lower end of the shaft 41, vertically rotatable in bearings $41^x$, $41^y$, seen in Fig. 1, is mounted a bevel gear 42, which drives another bevel gear wheel 43, which is mounted on a shaft which carries sprockets that drive the conveyor belt 38. It will be noted that the conveyor will dump the excess dirt at the side of the road.

When it is necessary for the machine to move from one place to another, the cutter drum is elevated until it clears the ground and by the action of the levers 13, the clutch is disengaged and the machine is then driven in the same manner as an ordinary caterpillar tractor. The sprocket wheels 44 driven from the tractor differential become the drivers and the machine is guided by the steering wheel mechanism 45.

Referring to Figs. 5 and 6; form members 47 extend from the periphery of one drum head 48 of the cutter to the other, being rigidly secured by bolts $47^x$. These forms have their forward faces $47^y$ substantially lying in radii of the drum 10, while their rear faces slope rearwardly as at $47^z$. The knives 49 are preferably of steel and are bolted, each, as at $49^x$ to the top of a form 47, their cutting edges $49^y$ lying in a circle of larger diameter as seen in Fig. 5. The dirt collectors are channel shaped recesses 37 forming a plurality of shoveling elements, each recess 37 is formed between the under side of a projecting knife 49, the front face $47^y$ of its form member 47 and the rear face $47^z$ of an adjacent form member 47. These knives can be unbolted when sharpening is necessary. The knives are spirally arranged on the drum as seen in Figs. 2 and 6.

Such modifications may be employed as lie within the scope of the appended claims.

Having fully described our invention, what we now claim as new and desire to secure by Letters Patent is:

1. In a tractor driven road surfacing machine, a horizontal transverse driven shaft rotatably mounted thereupon; a driven drum horizontally rotatable at the forward end of said machine; a driven conveying mechanism transversely arranged directly in rear of said drum, knife elements on said drum leading from end to end thereof, and recessed shoveling elements under said knives; and means for rotating said shaft, drum and conveyor whereby under intermittent forward movements of the tractor, the knife and recessed elements of the drum are rotatable towards the transverse conveying mechanism from above.

2. In a tractor driven road surfacing machine, a horizontal transversely disposed driven shaft rotatably mounted thereupon; arm members pivotally supported on said shaft, adjustable jack members for adjustably pivoting said arm members; a driven drum horizontally and transversely disposed as the forward element of the machine and carried by said arm members; a driven conveying mechanism transversely arranged directly behind and in the rear of the said drum, knife elements on said drum's periphery arranged from end to end thereof and in consecutive series and having recessed shoveling channel like elements under said knives; means for rotating said shaft, drum and conveyor and whereby said knife and shoveling elements of the drum are rotatable towards the transverse conveying mechanism from above.

JAMES R. MOORE.
THOMAS B. MOORE.

Witnesses:
M. Y. CHARLES,
R. WYLIE.